United States Patent [19]

Moller et al.

[11] Patent Number: 4,457,338

[45] Date of Patent: Jul. 3, 1984

[54] TELESCOPING BOOM SUPPORTED FLIP-FLOP SERVICE LINE

[75] Inventors: Thomas A. Moller, Brea; Houston W. Knight, Whittier, both of Calif.

[73] Assignee: FMC Corporation, Chicago, Ill.

[21] Appl. No.: 469,359

[22] Filed: Feb. 24, 1983

Related U.S. Application Data

[63] Continuation of Ser. No. 244,529, Mar. 16, 1981, abandoned.

[51] Int. Cl.³ ............................................. F16L 27/00
[52] U.S. Cl. ..................................... 137/615; 137/899
[58] Field of Search ................... 137/355.24, 615, 899, 137/899.1

[56] References Cited

U.S. PATENT DOCUMENTS

| | | |
|---|---|---|
| 3,053,320 | 9/1962 | Steincamp . |
| 3,217,748 | 11/1965 | Harper . |
| 3,281,080 | 10/1966 | Hogg . |
| 3,399,909 | 9/1968 | Ambrose . |
| 3,459,222 | 8/1969 | McElroy . |
| 3,498,325 | 3/1970 | Ashton . |
| 3,721,260 | 3/1973 | Stahmer . |
| 3,942,554 | 3/1976 | Werner . |
| 4,130,134 | 12/1978 | Castle . |
| 4,391,297 | 7/1983 | Knight .......................... 137/615 |

Primary Examiner—Gerald A. Michalsky
Attorney, Agent, or Firm—Lloyd B. Guernsey; Walter W. Ritt, Jr.; Richard B. Megley

[57] ABSTRACT

A telescoping boom assembly supported articulated well service pipeline for the transfer of pressurized fluids from service vehicles to petroleum wellheads for the treatment and stimulation of production oil wells. The boom assembly is mounted on a truck, trailer, or other suitable mobile transport, and the articulated pipeline comprises a pair of long straight end pipe sections interconnected by a plurality of shorter intermediate pipe sections and by swivel joints. The two end pipe sections are aligned generally parallel with the telescoping boom and the intermediate pipe sections flip-flop to change their direction of alignment as the pipeline is extended and retracted. The flip-flop feature provides a maximum change in length of the pipeline between the extended and the retracted positions with a minimum number of pipe swivel joints.

5 Claims, 16 Drawing Figures

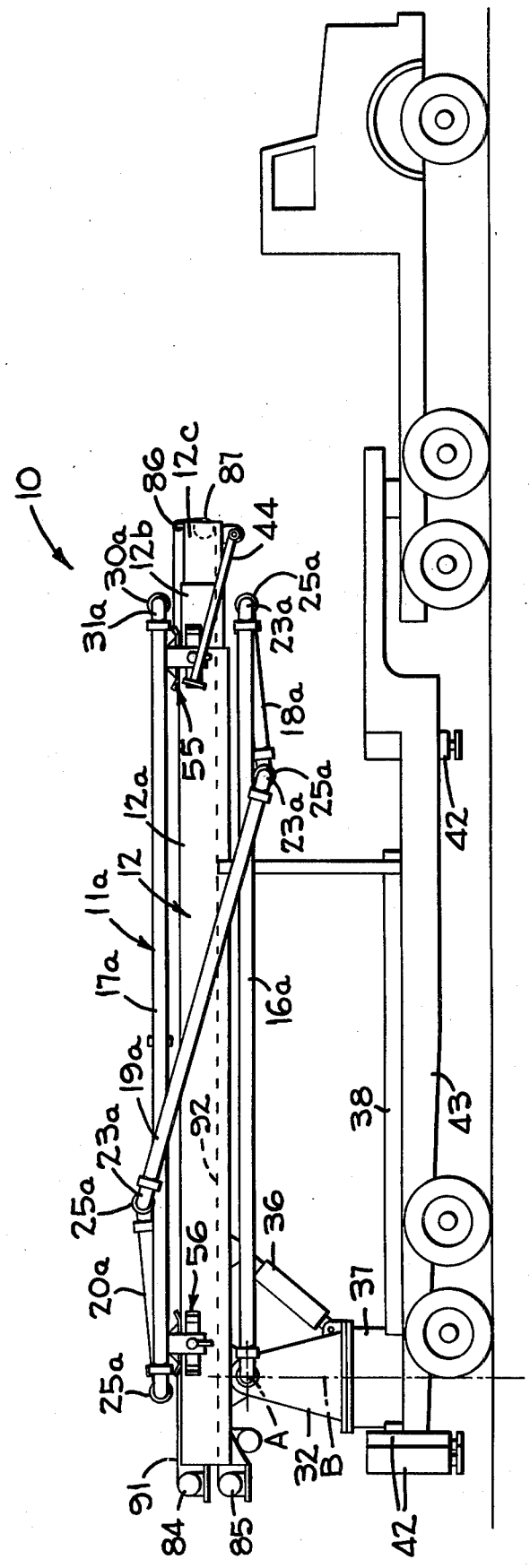
FIG_1

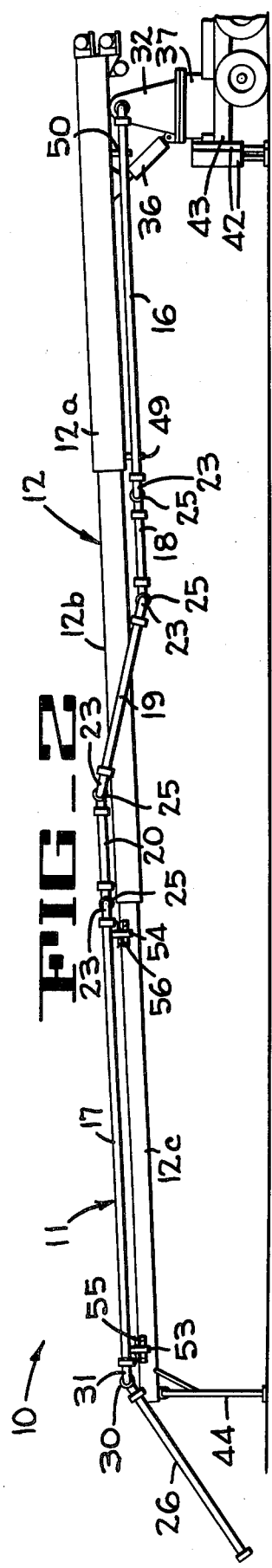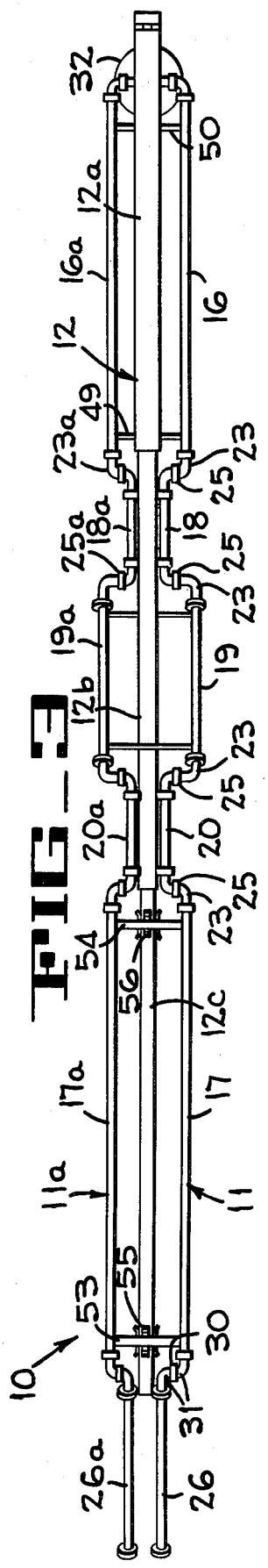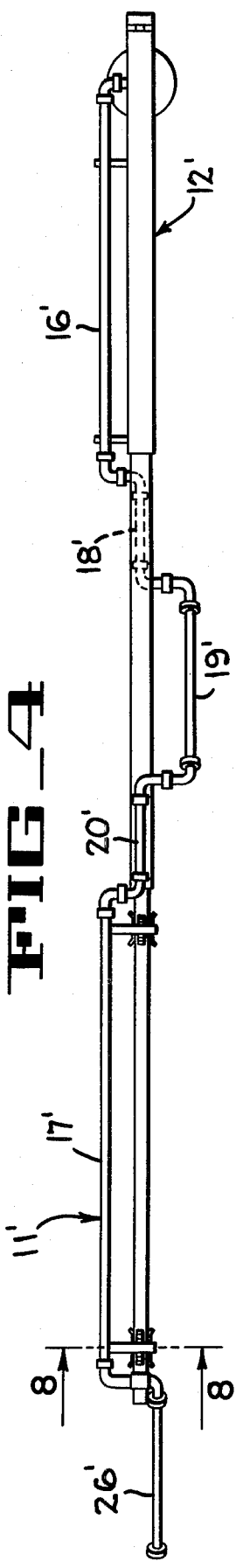

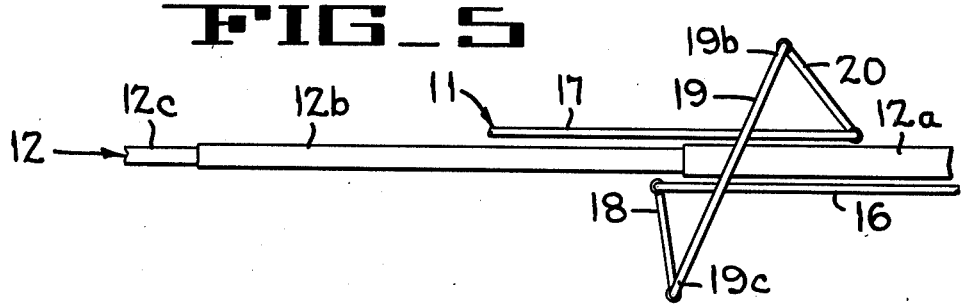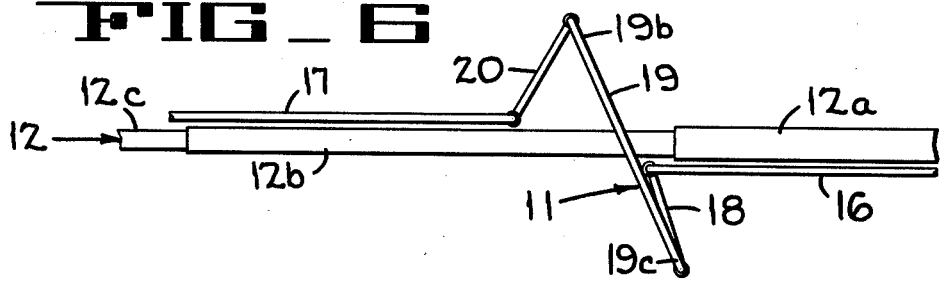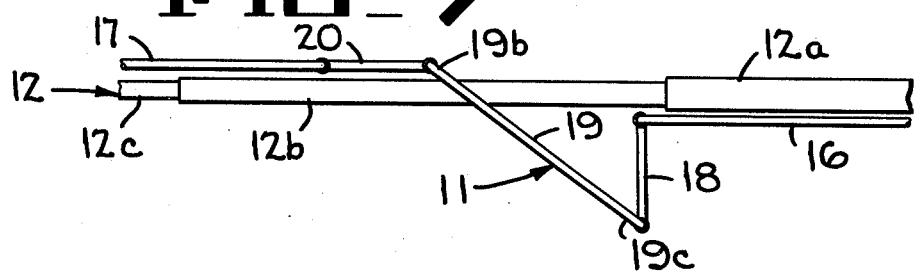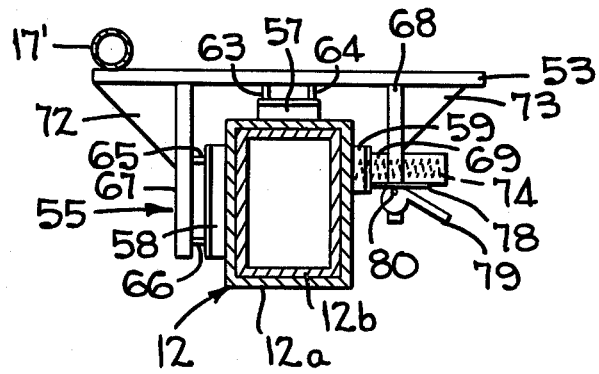

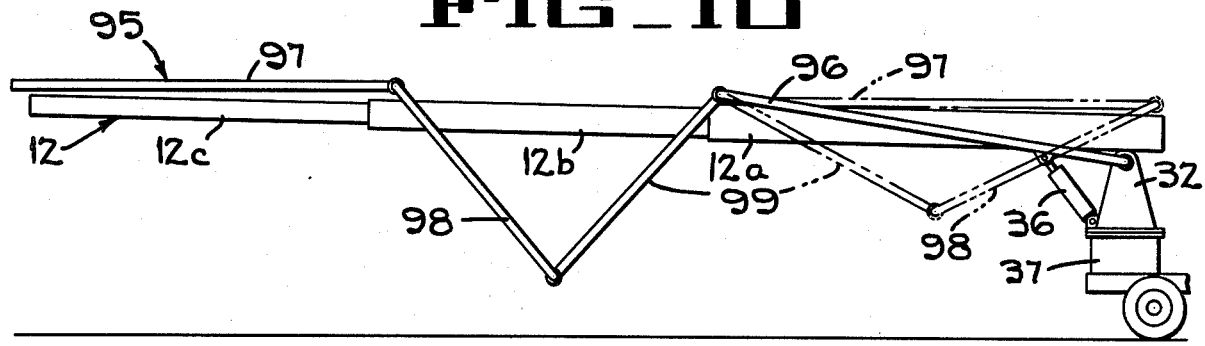
FIG_10
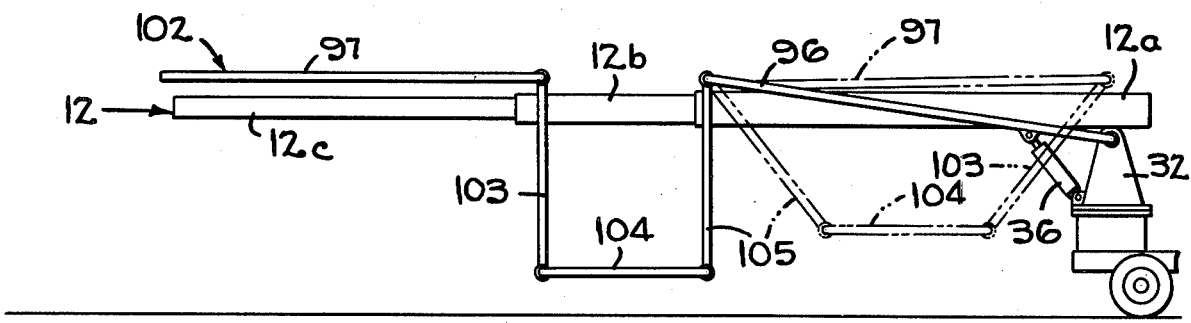
FIG_11
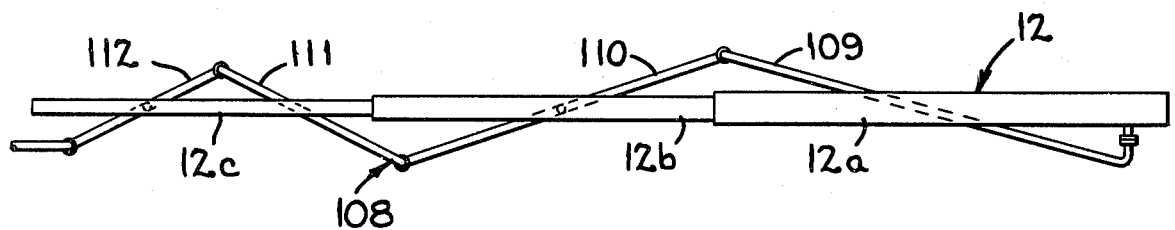
FIG_12

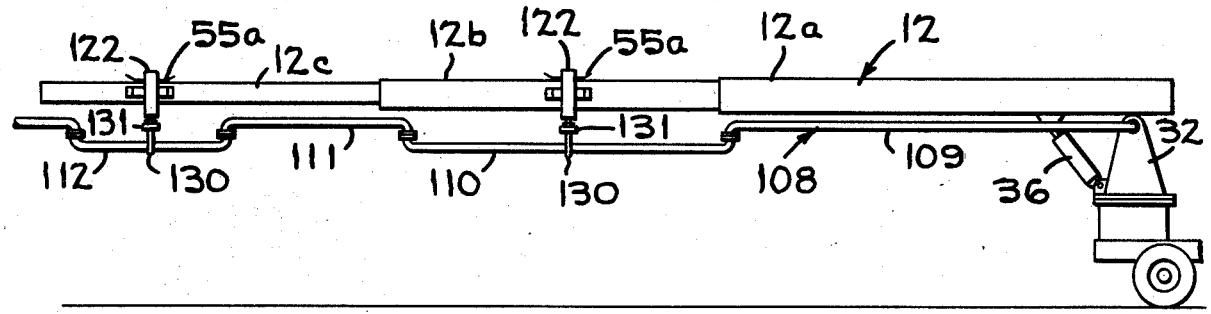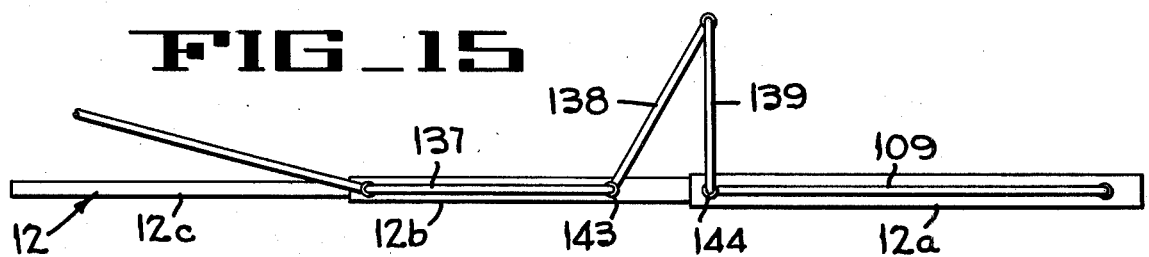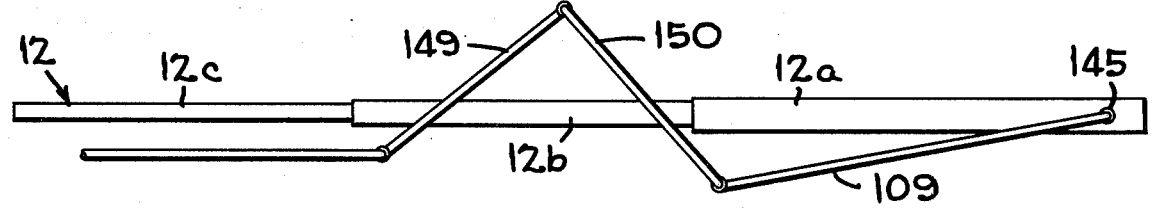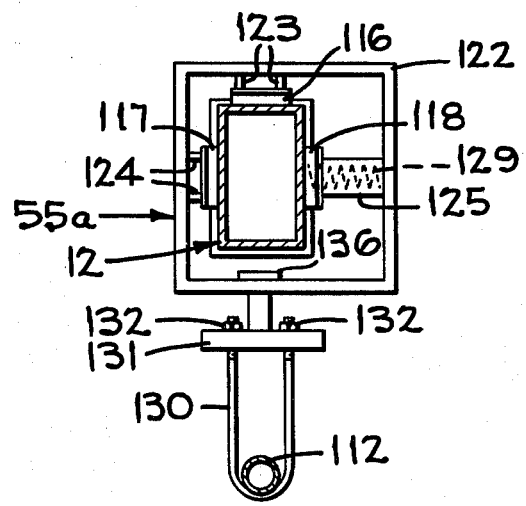

TELESCOPING BOOM SUPPORTED FLIP-FLOP SERVICE LINE

This is a continuation of application Ser. No. 244,529 filed Mar. 16, 1981, now abandoned.

BACKGROUND OF THE INVENTION

1. Field of the Invention

This invention relates to well servicing equipment, and more particularly, to apparatus for conducting pressurized fluids from a service vehicle to a wellhead.

2. Description of the Prior Art

During the course of producing fluids from a petroleum well it is often desirable or necessary to subject the well to a treatment procedure in order to stimulate its fluid production. This procedure usually involves the injection of fluid under high pressure, such as 20,000 psi, to fracture the producing earth formation, or the injection of an acid solution to dissolve or otherwise remove flow obstructing material, thereby increasing the flow of petroleum from the formation into the well. In order to carry out these well stimulation procedures, it is commonplace to employ an articulated pipe assembly, called a service line, to conduct the fluid from a pump system to the wellhead. Such a service line usually comprises a plurality of straight lengths of rigid pipe interconnected end-to-end by pipe swivel joints, and sufficient pipe unions to facilitate disassembly into sections that can be handled manually.

Where pipe of larger than normal diameter and thus of greater weight is used in order to increase the volume of fluid injected into the well at a given time period, or to reduce the time for injecting a given fluid volume, additional personnel and/or time are required to unload the service line sections from their transport, assemble them and connect the line to the wellhead and then disassemble the line and reload the sections upon completion of fluid injection. Another disadvantage of a conventional service line is that it rests unrestrained on the ground between the transport and the wellhead and thus is free to whip about and possibly injure personnel or equipment if it breaks under pressure. It is also known to employ an articulated well service pipeline mounted on and supported at all times by a mobile telescoping boom assembly that can be extended from its transport base to carry the service line to a wellhead for connection thereto and for retracting the service pipeline for transport from one location to another. This articulated pipeline may include a relatively large number of fairly short sections of pipe interconnected by a plurality of elbows and swivel joints that extend from and retract into their rest or stowed position in an accordion-like manner. Such accordion-type service lines are relatively expensive to build and it is difficult to drain fluid from these lines because some of the elbows and swivel joints are mounted below other portions of the service line.

SUMMARY OF THE INVENTION

The present invention overcomes the foregoing disadvantages by providing an articulated well service pipeline mounted on and supported at all times by a mobile telescoping boom assembly that can be extended from its transport base to carry the service line to a wellhead for connection thereto in a relatively safe, easy, quick and efficient manner. The service line includes a relatively long inboard pipe and long outboard pipe interconnected by a plurality of shorter intermediate pipes and by a plurality of swivel joints. The service line is mounted on the telescoping boom assembly with the inboard and outboard pipes generally parallel to the boom assembly. When the service line is in the fully extended position the inboard, outboard and intermediate pipes are all generally parallel to the boom assembly to provide the maximum length of service line with a minimum length of pipe. Only two or three intermediate pipes are required between the long inboard and outboard pipes so the number of swivel joints is low and the cost of construction of the service line is reduced. The generally straight line construction of the present service line makes it easier to drain off the fluid after the line is used than with the accordion-type folds of pipe used in some of the prior art service lines. The intermediate pipes flip-flop, or reverse their direction of orientation along the boom as the service line is extended or retracted.

BRIEF DESCRIPTION OF THE DRAWINGS

FIG. 1 is a diagrammatic side elevation of a telescoping boom supported articulated service line according to the present invention, showing the boom assembly in the retracted position and the service line folded for transportation on a truck.

FIG. 2 is a side elevation of the telescoping boom supported service line of FIG. 1, showing the boom extending from its truck supported pedestal base and resting on a jack stand at the outer end, and the service line extending generally parallel to the boom.

FIG. 3 is a plan view of the boom supported service line of FIG. 2, showing a dual service line.

FIG. 4 is a plan view of a boom supported service line similar to the boom supported service line of FIG. 2, showing a single service line.

FIGS. 5-7 are diagrammatic side elevations of the service line of FIGS. 1 and 2 showing the sequence of flip-flop movement of the intermediate pipes as the line changes from the retracted position shown in FIG. 1 to the extended position shown in FIG. 2.

FIG. 8 is an enlarged sectional view taken along the line 8—8 of FIG. 4.

FIG. 9 is an enlarged side elevation, partly in section, of a portion of FIG. 2 showing a pipe support device which slidably moves along the top of the boom assembly.

FIGS. 10, 11 and 13 are diagrammatic side elevations of other embodiments of the boom supported articulated service line of FIGS. 1-9.

FIG. 12 is a plan view of the articulated service line of FIG. 13.

FIG. 14 is a vertical section of a sliding support for connecting the service line of FIGS. 12, 13, 15 and 16 to the boom assembly.

FIGS. 15 and 16 are bottom views of other embodiments of the boom supported service line of FIGS. 1-13.

DESCRIPTION OF THE PREFERRED EMBODIMENT

As shown in FIGS. 1-3, a telescoping boom articulated service line 10 according to the present invention comprises an articulated service line assembly 11 (FIG. 2) mounted on a telescoping boom assembly 12. The service line 10 may include either a single service line assembly 11' as shown in FIG. 4 or a pair of substantially parallel assemblies 11, 11a as shown in FIG. 3.

The service line assembly 11 comprises a long inboard pipe 16 and a long outboard pipe 17 interconnected by a plurality of shorter pipes 18-20 and by a plurality of elbows 23 and swivel joints 25. Another short section of pipe 26 is connected to the outer end of each of the service line assemblies 11, 11a by a swivel joint 30 and a pair of elbows 31. The pipe 26 connects the corresponding service line assembly 11, 11a, 11' to a wellhead (not shown).

The telescoping boom assembly 12 (FIGS. 1-4) comprises three boom sections 12a, 12b and 12c. The inner section 12a which is not extendable, is pivotally mounted on a turret 32 for rotation in a vertical plane about a horizontal axis A by an elevating cylinder 36. The turret 32 (FIG. 1) is mounted on a cylindrical base 37 for rotation about a vertical axis B, and the entire apparatus is suitably mounted on a subframe platform 38 with extendable stabilizing outriggers 42 and installed on a truck chassis 43 or other suitable mobile transport vehicle for moving the apparatus to the job sites. The details of the telescoping boom 12, and of the means for operating it, are not critical to the present invention, and in fact various types of telescoping boom assemblies such as described in Chalupsky et al, U.S. Pat. No. 3,841,494, issued Oct. 15, 1974, and Tiffin et al, U.S. Pat. No. 4,016,688, issued Apr. 12, 1977, both of which are herein incorporated by reference, are suitable for use with the present invention.

An adjustable jack stand 44 (FIG. 2) can be positioned at the tip of the boom assembly 12 to provide an additional end support to relieve the boom of cantilever loading during the fluid transfer operation. The jack can be pivotally connected, in a removable manner or otherwise as desired, to the tip of the boom assembly on the outer end of the boom section 12c. Thus, the jack stand can be a separated portable apparatus, or can be carried by the boom to lessen the manual effort required to install and remove it.

The inboard pipes 16, 16a (FIGS. 2, 3) of the dual service line apparatus are connected to the inboard section 12a by a pair of supports 49, 50 and are pivotally connected to the turret 32 at their inner ends. The outboard pipes 17, 17a are rigidly connected to a pair of supports 53, 54 which are connected to a pair of sliding support devices 55, 56 (FIGS. 1-4, 8 and 9) for movement along the length of the boom support assembly 12.

The sliding support devices (FIG. 8) each includes a plurality of pads 57-59, made from a low friction material such as Teflon, and secured to the corresponding support 53, 54 by a plurality of brackets 63-69. The brackets are reinforced by a pair of gussets 72, 73 connected between the brackets and the support 53. The support device is aligned with the boom sections 12a-12c by a spring 74 mounted between the pad 59 and the bracket 69. The spring 74 (FIG. 8) presses the pad 59 against the boom sections 12a-12c to keep the support device snugly around the boom sections which vary in size. The pads 57-59 each include a pair of turned-up end portions 75 (FIG. 9) to facilitate the sliding movement of the pads along the boom sections 12c to 12a as the service line assembly is extended and retracted along the boom assembly. The pad 59 can be locked against the boom assembly section 12a-12c by a rod 78, secured to the pad 59 and by a lever 79 pivotally connected to the bracket 68 by a pin 80. In the locked position a portion of the lever is forced against the rod 78 when the lever is moved counterclockwise into the position shown in FIG. 8. When the lever is rotated clockwise the pin 78 and the pad 59 are free to move toward and away from the boom.

A pair of winches 84, 85 (FIG. 1), a pair of sheaves 86, 87 and a pair of cables 91, 92 provide means for moving the service line assembly 11 from the retracted position shown in FIG. 1 to the fully extended position shown in FIGS. 2-4 and to return it to the retracted position when desired. The cable 92 extends from the winch 85 through the boom assembly 12, over the sheaves 87, 86 to the sliding support device 55. When the boom assembly 12 is in the extended position and the winch 85 is energized, the cable 92 pulls the support device 55 and the outer end of the pipes 17, 17a outward into the position shown in FIG. 3. When the winch 84 is energized the cable 91 pulls the support device 56 and the attached service line assembly into the retracted position shown in FIG. 1, and the boom assembly can be retracted also back into the position shown in FIG. 1 by the conventional means (not shown).

Operation of the telescoping boom supported articulated service line according to the present invention can be effected as follows. After transportation to the job site, the vehicle mounted apparatus is positioned at a safe convenient location with respect to the wellhead, and the outriggers 42 extended into functional position. The telescoping boom assembly is aligned with the wellhead, as by rotating the turret 32 and/or elevating or lowering the boom by means of the cylinder 36, and the boom sections 12b, 12c are extended to a desired position near the wellhead. At this time the jack stand 44 is positioned and set, and the winch 85 is energized to pull the service line assembly 12 into position for connecting the outer end of the section of pipe 26 to the wellhead. Following treatment of the well the winch 84 is energized to move the service line into its stowed position (FIG. 1) and the boom is returned to its retracted position for transport to another job site.

The flip-flop action of the shorter intermediate pipes 18-20 as the service line assembly moves between the retracted and the extended positions is shown sequentially in FIGS. 1, 5, 6, 7 and 2. As the outboard pipe 17 is moved outward from the retracted position (FIG. 1) the upper end 19b of the pipe 19 moves upward (FIG. 5) and the lower end 19c moves downward. Further outward movement of the pipe 17 (FIG. 6) moves end 19b further outboard than end 19c (FIG. 7) until the pipe 19 is reversed in the direction of alignment along the boom assembly 12 into the position shown in FIG. 2. The pipes 18, 20 also are flip-flopped into a reverse direction of alignment along the boom assembly. This flip-flop feature allows maximum change in length of the service line between the retracted and the extended positions. The pipes are all positioned end-to-end in a generally straight line when the service line is in an extended position and the inboard and outboard pipes are parallel and side-by-side in the retracted position.

OTHER EMBODIMENTS OF THE PRESENT INVENTION

The embodiment shown in FIG. 4 differs from the embodiment shown in FIG. 3 mainly by using a single service line assembly 11' rather than the dual line assembly shown in FIG. 3.

The embodiment of the service line assembly shown in FIG. 10 discloses a service line 95 having an inboard pipe 96 and an outboard pipe 97 interconnected by a pair of intermediate pipes 98, 99, with the intermediate pipes 98, 99 moving in a vertical plane as the service line is extended and retracted. The retracted pipes are shown in the phantom lines of FIG. 10.

The embodiment shown in FIG. 11 discloses another service line 102 having a trio of intermediate pipes 103-105 which also move in a vertical plane as the service line is extended and retracted.

The embodiment shown in FIGS. 12 and 13 discloses another service line 108 having the pipes 109-112 mounted below the boom assembly 12 so that the pipes move in a horizontal plane as the service line is extended and retracted. The pipes 110-112 are supported by sliding support devices 55a (FIGS. 13-14) having a plurality of pads 116, 118 secured to a frame 122 by a plurality of brackets 123-125. The hollow bracket 125 (FIG. 14) includes a compression spring 129 which biases the pad 118 against the boom 12. The pipes 110, 112 are connected to the frame 122 of the support device by a U-shaped bolt 130 secured to a plate 131 by a pair of nuts 132. The plate 131 is connected to the frame 122 by a swivel joint 136.

The embodiment shown in FIG. 15 includes an inboard pipe 109 and an outboard pipe 137 interconnected by a pair of shorter intermediate pipes 138, 139 and by a pair of swivel joints 143, 144. The inboard pipe 109 may be fixed to the underside of the boom assembly 12 and the outboard pipe 137 slidably connected to the boom by the support device 55a (FIG. 14) or by other suitable means. The inboard and outboard pipes 109, 137 remain parallel to the boom at all times and the pipes 138, 139 flip-flop as the outboard pipe 137 moves from a fully extended position to a fully retracted position.

In the embodiment shown in FIG. 16 the inboard pipe 109 is free to pivot about a swivel joint 145 at the inner end thereof. A pair of intermediate pipes 149, 150 are slidably and pivotally connected to the underside of the boom assembly 12.

The present invention provides a service pipeline having a large change in length between the extended position and the retracted position while using a few intermediate sections of pipe connected between an inboard and an outboard pipe. The intermediate pipes flip-flop, or change their direction of orientation, as the pipeline changes from an extended position to a retracted position.

Although the best mode contemplated for carrying out the present invention has been herein shown and described, it will be apparent that modification and variation may be made without departing from what is regarded to be the subject matter of the invention.

What is claimed is:

1. A boom-supported articulated pipeline for use with a telescoping boom assembly having a plurality of boom sections, said pipeline having a reduced number of pipe lengths to decrease cost and weight while retaining the required length, said pipeline comprising:

an inboard pipe mounted on said boom assembly generally parallel to an inboard boom section and attached to said inboard boom section;

an outboard pipe mounted on said boom assembly generally parallel to said boom assembly and movable along the full length of said boom assembly;

first, second and third intermediate pipe sections connected end-to-end through a pair of swivel joints;

means for pivotally connecting said intermediate pipe sections between an outer end of said inboard pipe and an inner end of said outboard pipe through respective swivel joints at said outer and inner ends; and means for flip-flopping each of said intermediate pipe sections to reverse their direction of alignment so that one end of each of said intermediate pipe sections extends in a direction inwardly from said outer end of said inboard pipe when said pipeline is in a retracted position, and said one end of each of said intermediate pipe sections extends in a direction outwardly from said outer end from said inboard pipe when said pipeline is in an extended position and, one end of each of said inboard pipe and said outboard pipe extend outwardly from the inner end of said inboard pipe and in the same direction as each said one end of each said intermediate pipe sections when said pipeline is in extended position, and, said one end of each of said inboard and outboard pipes also extend in the same said outward direction when said pipeline is in retracted position, while each said one end of said intermediate pipes extend inwardly in said retracted position.

2. A boom-supported pipeline as defined in claim 1 including means for retaining said outboard pipe parallel to said boom sections as said outboard pipe is moved along the length of said boom assembly.

3. A boom-supported pipeline as defined in claim 1 wherein said intermediate pipe sections extend generally transversely to said inboard and said outboard pipes when said pipeline is in a partially extended position.

4. A boom-supported pipeline as defined in claim 1 wherein said intermediate pipe sections are positioned end-to-end to form a generally straight line with said inboard and said outboard pipes when said pipeline is in an extended position and said inboard and said outboard pipes are parallel and side-by-side in the retracted position.

5. A boom-supported pipeline as defined in claim 1 wherein said inboard and said outboard pipes are both retained generally parallel to said boom assembly as said pipeline moves between a retracted position and an extended position.

* * * * *